United States Patent [19]

Erlenmaier et al.

[11] Patent Number: 4,998,783
[45] Date of Patent: Mar. 12, 1991

[54] TRACK ROLLER OR GUIDE ROLLER FOR TRACK-LAYING VEHICLES

[75] Inventors: Gunter Erlenmaier, Vellmar; Klaus Spies, Remscheid, both of Fed. Rep. of Germany

[73] Assignee: Diehl GmbH, Nuremberg, Fed. Rep. of Germany

[21] Appl. No.: 355,567

[22] Filed: May 22, 1989

[30] Foreign Application Priority Data

Jun. 3, 1988 [DE] Fed. Rep. of Germany ....... 3818841

[51] Int. Cl.⁵ .............................................. B62D 55/14
[52] U.S. Cl. ....................................... 305/56; 305/24
[58] Field of Search ......................... 152/7, 40, 41, 42; 305/56, 21, 22, 23, 24, 27, 28, 57; 295/7, 11

[56] References Cited

U.S. PATENT DOCUMENTS 2,911,252  11/1959  Templeton ............................ 295/11
2,923,570  2/1960  Jorn et al. ............................. 295/11
2,954,259  9/1960  Kordes ................................... 295/11

FOREIGN PATENT DOCUMENTS 0199911  11/1986  European Pat. Off. .............. 305/56
737756  7/1943  Fed. Rep. of Germany ........ 305/56
1150583  6/1963  Fed. Rep. of Germany ........ 305/56
3515918  11/1986  Fed. Rep. of Germany .
2129192  10/1972  France .
461015  4/1975  U.S.S.R. ................................ 305/21

Primary Examiner—Russell D. Stormer
Attorney, Agent, or Firm—Scully, Scott, Murphy & Presser

[57] ABSTRACT

A track roller or guide roller for track-laying vehicles, which is constituted of two disc members which leave open a guide gap for the teeth of the track, and two cylindrical regions which are equipped with rubber tires or treads.

10 Claims, 1 Drawing Sheet

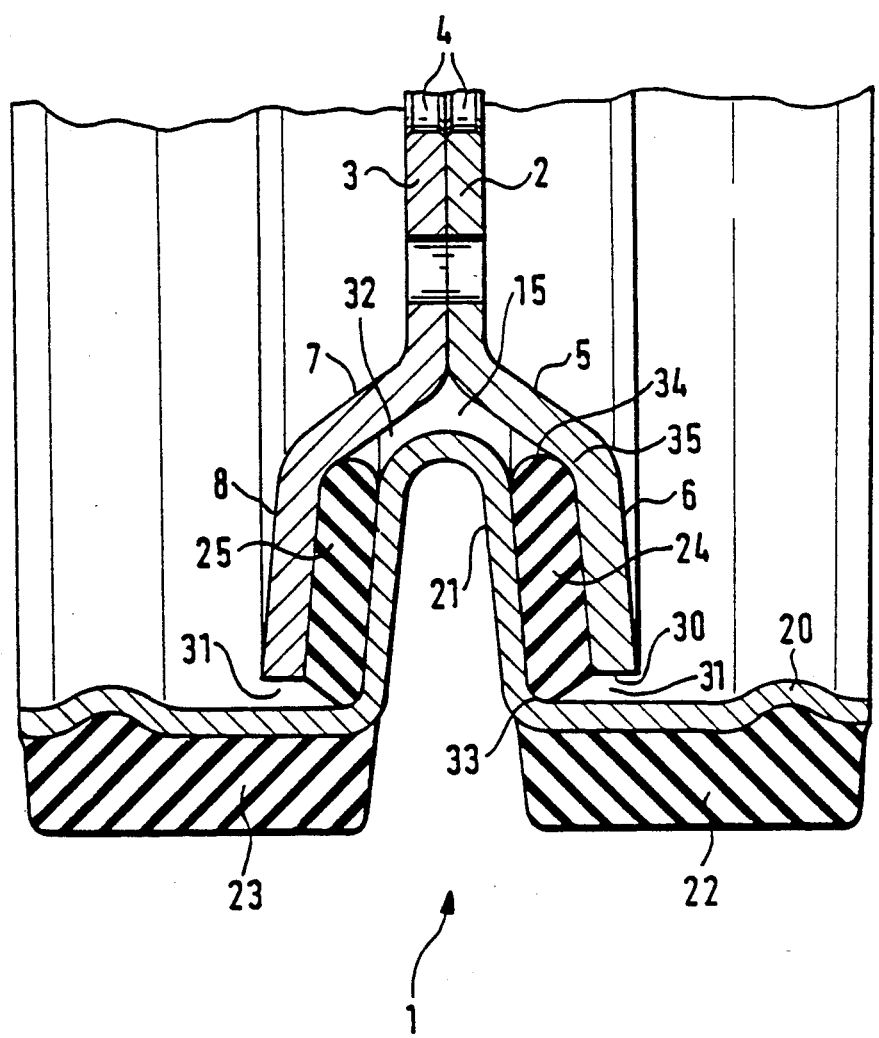

TRACK ROLLER OR GUIDE ROLLER FOR TRACK-LAYING VEHICLES

BACKGROUND OF THE INVENTION

1. Field of the Invention

The present invention relates to a track roller or guide roller for track-laying vehicles, which is constituted of two disc members which leave open a guide gap for the teeth of the track, and two cylindrical regions which are equipped with rubber tires or treads.

2. Discussion of the Prior Art

From the disclosure of German Laid-Open Patent Application 35 15 918 Al, there has become known a track roller for track-laying vehicles wherein two interconnected disc members each possess a cylindrical region and a guide gap for the teeth of the track being arranged therebetween. Consequently, the damping capability of the track roller is hereby limited to the rubber tires or treads which are arranged about the circumference.

SUMMARY OF THE INVENTION

Accordingly, it is an object of the present invention to provide a track roller or guide roller for track-laying vehicles, through which there is substantially increased the resilient and damping assumption of vertically acting forces; for example, those which are encountered due to unevenesses in the surface of the roadway.

The invention achieves this object in that the disc members which are connectible with a wheel hub, each possess a wheel rim which includes the cylindrical regions, and are resiliently interconnected through the intermediary of at least one molded rubber member.

BRIEF DESCRIPTION OF THE DRAWING

Further advantages of the invention are described in greater detail hereinbelow with regard to the preferred embodiment which is illustrated in the single Figure of the accompanying drawing which shows a cross-sectional view through a track roller or wheel for a track-laying vehicle.

DETAILED DESCRIPTION

A track roller or wheel 1 for a track-laying vehicle includes two wheel disc members 2 and 3 which are interconnected through suitable screw connections (not shown), incorporating bores 4 for a hub (not shown), portions 5, 7 of the disc members 2 and 3 being of a doubly conically bent configuration so as to form a two-stage conical recess 15, a unitary rim portion 20 with a hollow rib 21 and rubber tires or treads 22 and 23, and two annular spring members 24 and 25 which are arranged along the sides of the hollow rib 21.

Each wheel rim portion 20 is connected to the respective rubber tires or treads 22 and 23 and the annular spring members 24 and 25 through vulcanization.

A radial spacing 31 is provided intermediate each of the respective end edges 30 of the disc members 2 and 3; in essence, the segments 6 and 8 thereof, with regard to the applicable rim portion 20. This spacing 31 represents the radial resilient shock-absorbent path of displacement between the rim portions 20 and the disc members 2 and 3, whereby the edge 30 strikes against the rim portion 20 in the position of maximum resilient displacement inasmuch as the radial spacing 32 is greater than that of the spacing 31.

The annular springs 24 and 25 each bear against the respective disc members 2 and 3 over respective radii 33 and 34, both at the foot ends of the hollow rim 21 as well as along the bend 35 of the disc segments 5 and 6. The annular springs 24 and 25 can also be loosely inserted between the rim portion 20 and the disc members 2 and 3.

Instead of the above-mentioned screw connections, the disc members 2 and 3 can also be welded or riveted to each other.

Through the invention there is achieved a maximum resilient and shock-absorbent assumption of vertically acting forces which; for example, are encountered due to unevenesses in the roadway surface.

It is also of importance that there is increased the degree of insulation with regard to any introduced disturbances.

The separation of the tire or tread function into tires and spring; namely, into the rubber treads 22, 23 and the annular springs 24 and 25, allows for the tires or treads to be superiorly designed from structural-mechanical points of view. Those points of view concern the resistance thereof to initial tearing, continued tearing and to wear.

Moreover, due to the separation of the tire or tread function there is achieved a significantly better effect during the resilient and shock-absorbing assumption of horizontal forces and shocks which are encountered from travel-dynamic phenomena; for example, when travelling along an inclined surface, while negotiating a bend or even during steering corrections. Furthermore, there is also present a reduction in the vibration energy which is introduced into the wheel disc members and in the airborne noise which is emitted therefrom.

In addition, the capability in pivoting of the rim portion with resilient angular limitation reduces the damper of any deformation of the rim portion 20 and also the tendency for the vehicle of running out of the track.

The capability in resilient movement for the rim portions in all degrees of freedom reduces the extent of any of the contact surfaces of guide sprockets (not shown) and of the rim portion 20.

The annular springs 24 and 25 allow for the resilient radial contacting of the rim portions 20 against the disc members 2 and 3.

The separation between the rim portion 20 and the disc members 2 and 3 facilitates the replaceability of components of wheel or roller components, especially of the rim portion 20 and the annular springs 24 and 25. There is also freedom in selection of different, presently optimized materials and methods of manufacture for the rim portions and wheel disc members; for example, such as steel or aluminum; and employing for the treads 22, 23 and the annular springs 24 and 25; for example, polyurethane and natural rubber.

By means of the present invention there are substantially reduced the vibration and shock loads acting on the parts which are connected downstream of the track rollers; for example, such as swings, swing mounting arrangement, vehicle body shell, vehicle installations, and so forth.

In the case of a combat vehicle, there are also improved the observation capabilities and accuracy of air against a target, as well as the steerability of the vehicle equipped with the inventive structure. At the same time, in comparison with the state of the art, there is a reduction in any adverse influences over the combat effectiveness of the crew of the vehicle which would be caused by disturbing vibrations and noises.

An essential concept of the invention resides in the separation of the track roller into wheel disc members 2 and 3, the rim portion 20 and into the resilient annular springs 23 and 24.

In addition to employment with caterpillar tracks operating pursuant to the connector principle, the above-described track roller or wheel is also adapted for collective other types of track chains for vehicles; for example for belt chains and hinge chains.

The invention can also be used in connection with guide rollers and support rollers.

What is claimed is:

1. A track or guide roller for track-laying vehicles, comprising:
    first and second disc members connected together, connectable with a hub, and forming a guide gap between the first and second disc members for receiving guide teeth, each of the first and second disc members including
        (i) a central portion,
        (ii) a first conical portion connected to the central portion and radially and laterally extending outward therefrom, and
        (iii) a second conical portion connected to the first conical portion and radially and laterally extending outward therefrom;
    a rim member extending radially outside the first and second disc members, and including
        (i) first and second cylindrical portions located, respectively, on first and second lateral sides of the guide gap, and
        (ii) a hollow rib portion connected to and radially extending inward from the first and second cylindrical portions, and extending into the guide gap, laterally between and spaced from the first and second disc members,
    wherein the hollow rib portion is laterally spaced from the second conical portion of the first disc member, and the hollow rib portion and the second conical portion of the first disc member define therebetween a first annular interspace; and the hollow rib portion is laterally spaced from the second conical portion of the second disc member, and the hollow rib portion and the second conical portion of the second disc member define therebetween a second annular interspace;
    tread means mounted on the first and second cylindrical portions of the rim member;
    a first annular resilient member engaging and laterally captured between the first disc member and the hollow rib portion of the rim member, and substantially completely filling the first annular interspace; and
    a second annular resilient member engaging and laterally captured between the second disc member and the hollow rib portion of the rim member, and substantially completely filling the second annular interspace;
    wherein the first and second conical portions of the first disc member form a first curved intersection, and the first annular resilient member engages said first curved intersection in a complementary fit therewith, and the first and second conical portions of the second disc member form a second curved intersection, and the second annular resilient member engages said second curved intersection in a complementary fit therewith.

2. A track or guide roller according to claim 1, wherein the first and second disc members are held normally radially spaced from the first and second cylindrical portions of the rim member by the first and second annular resilient members respectively.

3. A track or guide roller according to claim 2, wherein:
    the hollow rib portion of the rim member is normally radially spaced from the disc members; and
    the radial spacing between the hollow rib portion and the disc members is greater than the radial spacing between the disc members and the rim member.

4. A track or guide roller according to claim 3, wherein the rim member consists of a single, integral member.

5. A track or guide roller according to claim 4, wherein the first and second annular resilient members are vulcanized to the rim member.

6. A track or guide roller according to claim 4, wherein the first and second annular resilient members are vulcanized to the disc members.

7. A track or guide roller according to claim 4, wherein the first and second annular resilient members are vulcanized to the rim member and to the disc members.

8. A track or guide roller according to claim 3, wherein the hollow rib portion of the rim member includes:
    a first section laterally spaced from and extending substantially parallel to the second conical portion of the first disc member; and
    a second section laterally spaced from and extending substantially parallel to the second conical portion of the second disc member.

9. A track or guide roller according to claim 8, wherein:
    the hollow rib portion and the first cylindrical portion of the rim member form a third curved intersection, and the first resilient member engages said third curved intersection in a complementary fit therewith;
    the hollow rib portion and the second cylindrical portion of the rim member form a fourth curved intersection, and the second annular resilient member engages said third curved intersection in a complementary fit therewith.

10. A track or guide roller according to claim 9, wherein:
    the first annular resilient member engages and is radially captured between the first cylindrical portion of the rim member and the first conical portion of the first disc member; the first annular resilient member and the first conical portion of the first disc member forming a radially extending space, and the first annular resilient member and the first cylindrical portion of the rim member forming a radially extending space to facilitate radial movement of the rim member; and
    the second annular resilient member engages and is radially captured between the second cylindrical portion of the rim member and the first conical portion of the second disc member; the second annular resilient member and the first conical portion of the second disc member forming a radially extending space, and the second annular resilient member and the second cylindrical portion of the rim member forming a radially extending space to facilitate radial movement of the rim member.

* * * * *